(12) United States Patent
Hotelling et al.

(10) Patent No.: US 8,390,582 B2
(45) Date of Patent: Mar. 5, 2013

(54) INTEGRATED TOUCH SCREEN

(75) Inventors: Steven Porter Hotelling, San Jose, CA (US); Marduke Yousefpor, San Jose, CA (US); Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 12/547,410

(22) Filed: Aug. 25, 2009

(65) Prior Publication Data

US 2011/0050585 A1    Mar. 3, 2011

(51) Int. Cl.
G06F 3/041    (2006.01)

(52) U.S. Cl. .................................... 345/173; 345/174
(58) Field of Classification Search .................. None
See application file for complete search history.

(56) References Cited

U.S. PATENT DOCUMENTS

| | | | |
|---|---|---|---|
| 4,891,604 A | 1/1990 | Cotreau | |
| 5,483,261 A | 1/1996 | Yasutake | |
| 5,488,204 A | 1/1996 | Mead et al. | |
| 5,515,007 A | 5/1996 | Moraveji | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 7,705,834 B2 | 4/2010 | Swedin | |
| 2005/0094038 A1* | 5/2005 | Choi et al. ...................... 349/12 |
| 2006/0026521 A1 | 2/2006 | Hotelling et al. | |
| 2006/0097991 A1 | 5/2006 | Hotelling et al. | |

(Continued)

FOREIGN PATENT DOCUMENTS

| JP | 2000-163031 A | 6/2000 |
|---|---|---|
| JP | 2002-342033 A | 11/2002 |

(Continued)

OTHER PUBLICATIONS

GB Combined Examination and Search Report mailed Feb. 1, 2011, for GB Application No. 1013997.0, filed Jun. 21, 2010, three pages.

(Continued)

*Primary Examiner* — Van Chow
(74) *Attorney, Agent, or Firm* — Morrison & Foerster LLP

(57) ABSTRACT

Displays with integrated touch sensing circuitry are provided. An integrated touch screen can include multi-function circuit elements that form part of the display circuitry of the display system that generates an image on the display, and also form part of the touch sensing circuitry of a touch sensing system that senses one or more touches on or near the display. The multi-function circuit elements can be, for example, capacitors in display pixels of an LCD that are configured to operate as display circuitry in the display system, and that may also be configured to operate as touch circuitry of the touch sensing system. For example, one or more circuit elements of the display pixel stackup can form a conductive portion of the touch sensing system, such as a charge collector, which can be operated with switches and conductive lines to sense touch.

11 Claims, 17 Drawing Sheets

U.S. PATENT DOCUMENTS

| | | | |
|---|---|---|---|
| 2006/0197753 | A1 | 9/2006 | Hotelling |
| 2008/0309631 | A1 | 12/2008 | Westerman |
| 2009/0135158 | A1* | 5/2009 | Takahashi et al. ............ 345/174 |
| 2009/0167325 | A1 | 7/2009 | Geaghan |
| 2010/0194695 | A1 | 8/2010 | Hotelling et al. |
| 2011/0050585 | A1* | 3/2011 | Hotelling et al. ............ 345/173 |

FOREIGN PATENT DOCUMENTS

| | | | |
|---|---|---|---|
| WO | WO-2004/053576 | A1 | 6/2004 |
| WO | WO-2005/043229 | A1 | 5/2005 |
| WO | WO-2007/146780 | A2 | 12/2007 |
| WO | WO-2007/146780 | A3 | 12/2007 |
| WO | WO-2011/028451 | A1 | 3/2011 |

OTHER PUBLICATIONS

International Search Report mailed Feb. 3, 2011, for PCT Application No. PCT/US2010/046225, filed Aug. 20, 2010, six pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

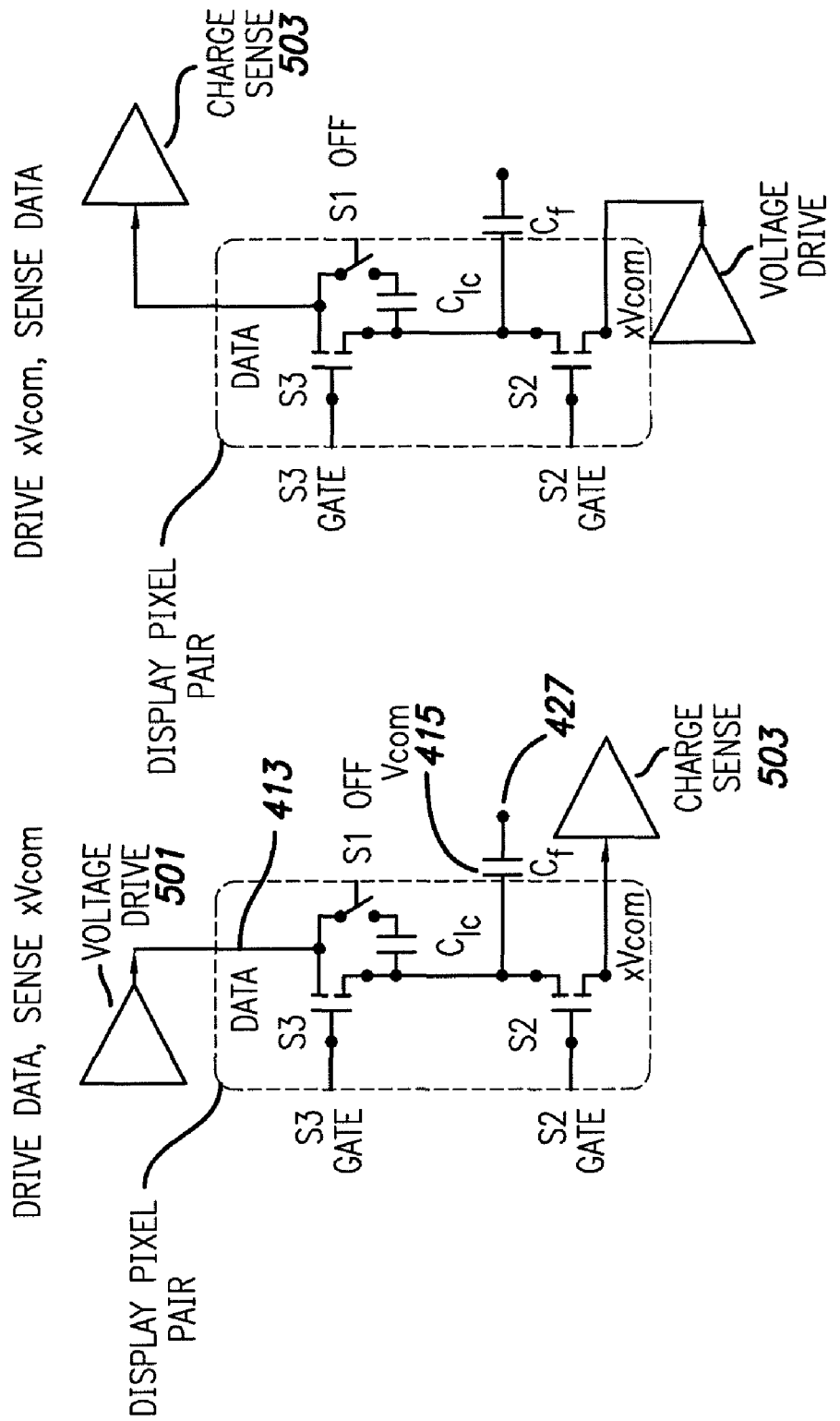

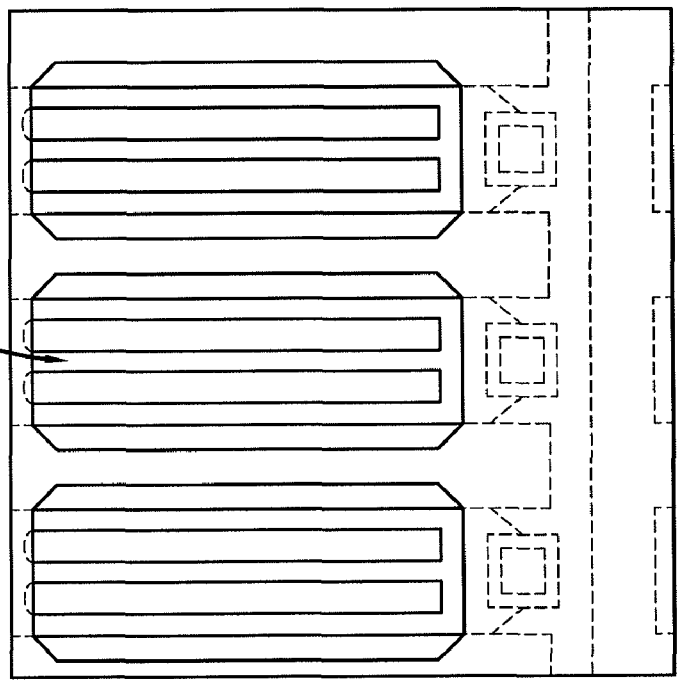
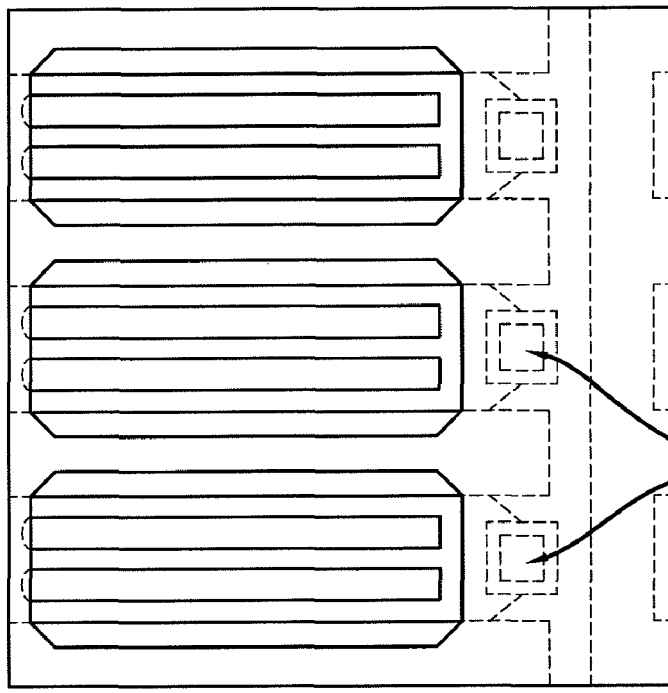
FIG. 15

INTEGRATED TOUCH SCREEN

FIELD

This relates generally to displays including display pixel stackups, and more particularly to configurations for grouping together circuit elements in the display pixel stackups to form touch sensing circuitry that senses touch on or near the display.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. However, overlaying a display with a touch sensor panel can have drawbacks, such as added weight and thickness, additional power required to drive the touch sensor panel, and decreased brightness of the display.

SUMMARY

This relates to integrating touch sensing circuitry into the display pixel stackup (i.e., the stacked material layers forming the display pixels) of a display, such as an LCD display. Various structures formed within a display pixel stackup are designed to operate as circuitry of the display system to generate an image on the display. An integrated touch screen can include multi-function circuit elements that form part of the display circuitry of a the display system that generates an image on the display, and also form part of the touch sensing circuitry of a touch sensing system that senses one or more touches on or near the display. The multi-function circuit elements can be, for example, capacitors in display pixels of an LCD that are configured to operate as storage capacitors/electrodes, common electrodes, conductive wires/pathways, etc., of the display circuitry in the display system, and that may also be configured to operate as circuit elements of the touch sensing circuitry. In this way, for example, a display with integrated touch sensing capability may be manufactured using fewer parts and/or processing steps, and the display itself may be thinner, brighter, and require less power.

BRIEF DESCRIPTION OF THE DRAWINGS

FIG. 5 illustrates an example method of sensing touch by charge transfer in the circuit of FIG. 4B.

FIG. 6 shows another example method of sensing touch by charge transfer in the circuit of FIG. 4B.

FIGS. 13-15 show an example touch screen pixel stackup and a manufacturing process for making the pixels according to various embodiments.

DETAILED DESCRIPTION

Figure 1C:
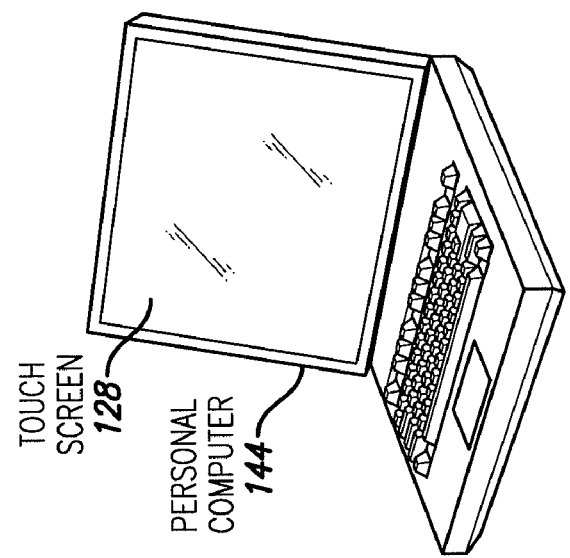
FIGS. 1A-1C show example systems in which an integrated touch screen according to various embodiments may be implemented.

In the following description of example embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

The following description includes examples in which touch sensing circuitry can be integrated into the display pixel stackup (i.e., the stacked material layers forming the display pixels) of a display, such as an LCD display. Display pixel stackups are typically manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., SiO2, organic materials, SiNx). Various structures formed within a display pixel stackup are designed to operate as circuitry of the display system to generate an image on the display. In other words, some of the stackup structures are circuit elements of the display circuitry. Some embodiments of an integrated touch screen can includes multi-function circuit elements that form part of the display circuitry of a the display system that generates an image on the display, and also form part of the touch sensing circuitry of a touch sensing system that senses one or more touches on or near the display. The multi-function circuit elements can be, for example, capacitors in display pixels of an LCD that are configured to operate as storage capacitors/electrodes, common electrodes, conductive wires/pathways, etc., of the display circuitry in the display system, and that may also be configured to operate as circuit elements of the touch sensing circuitry. In this way, for example, a display with integrated touch sensing capability may be manufactured using fewer parts and/or processing steps, and the display itself may be thinner, brighter, and require less power.

Example embodiments are described with reference to a Cartesian coordinate system in which the x-direction and the y-direction are equated to the horizontal direction and the vertical direction, respectively. However, one skilled in the art will understand that reference to a particular coordinate system is simply for the purpose of clarity, and does not limit the direction of the structures to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some example embodiments, an LCD display with integrated touch sensing functionality may include a matrix of conductive lines to address multi-function circuit elements of the display pixels to cause an image to be displayed during a display phase, and to address the multi-function circuit elements of the display to cause a touch to be sensed on the touch screen during a touch sensing phase. Thus, in some embodiments, the multi-function circuit elements may operate as part of the display system during the display phase, and may operate as part of the touch sensing system during the touch sensing phase. For example, in some embodiments, some of the lines may be driven with a first drive signal to drive particular regions of the touch screen during the touch sensing phase. In addition, one or more of the lines may be driven with a second drive signal that is 180 degrees out-of-sync with respect to the first drive signal to drive the regions of the touch screen. Driving lines with out-of-sync signals may reduce the static capacitance of the touch screens.

Figure 1B:
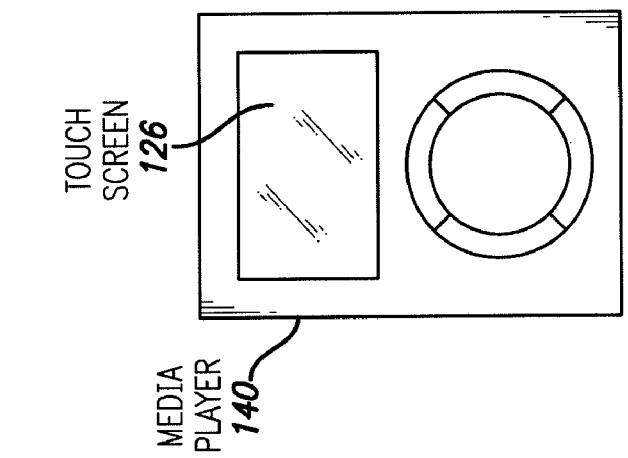
Figure 1A:
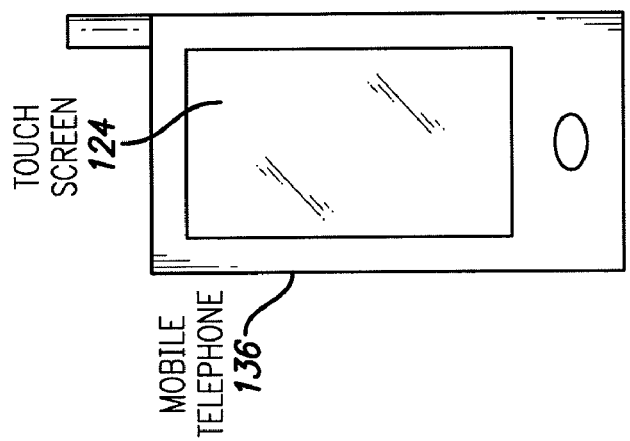

Some of the potential advantages of various embodiments, such as thinness, brightness, and power efficiency, may be particularly useful for portable devices, though use of various embodiments is not limited to portable devices. FIGS. 1A-1C show example systems in which an integrated touch screen according to various embodiments may be implemented. FIG. 1A illustrates an example mobile telephone 136 that includes an integrated touch screen 124. FIG. 1B illustrates an example digital media player 140 that includes an integrated touch screen 126. FIG. 1C illustrates an example personal computer 144 that includes an integrated touch screen 128.

In some embodiments, the touch sensing system can be based on capacitance. By detecting changes in capacitance at each of the touch pixels and noting the position of the touch pixels, the touch sensing system can recognize multiple objects, and determine the location, pressure, direction, speed and acceleration of the objects as they are moved across the touch screen.

By way of example, some embodiments of an integrated touch sensing system may be based on self capacitance and some embodiments may be based on mutual capacitance. In a self capacitance based touch system, each of the touch pixels can be formed by an individual electrode that forms a self-capacitance to ground. As an object approaches the touch pixel, an additional capacitance to ground is formed between the object and the touch pixel. The additional capacitance to ground results in a net increase in the self-capacitance of the touch pixel. This increase in self-capacitance is detected and measured by the touch sensing system to determine the positions of multiple objects when they touch the touch screen. In a mutual capacitance based touch system, the touch sensing system includes, for example, drive regions and sense regions, such as drive lines and sense lines. In one example case, drive lines are formed in rows while sense lines are formed in columns (e.g., orthogonal). The touch pixels are provided at the intersections of the rows and columns. During operation, the rows are stimulated with an AC waveform and a mutual capacitance is formed between the row and the column of the touch pixel. As an object approaches the touch pixel, some of the charge being coupled between the row and column of the touch pixel is instead coupled onto the object. This reduction in charge coupling across the touch pixel results in a net decrease in the mutual capacitance between the row and the column and a reduction in the AC waveform being coupled across the touch pixel. This reduction in the charge-coupled AC waveform is detected and measured by the touch sensing system to determine the positions of multiple objects when they touch the touch screen. In some embodiments, an integrated touch screen can be multi-touch, single touch, projection scan, full-imaging multi-touch, or any capacitive touch.

Figure 2:
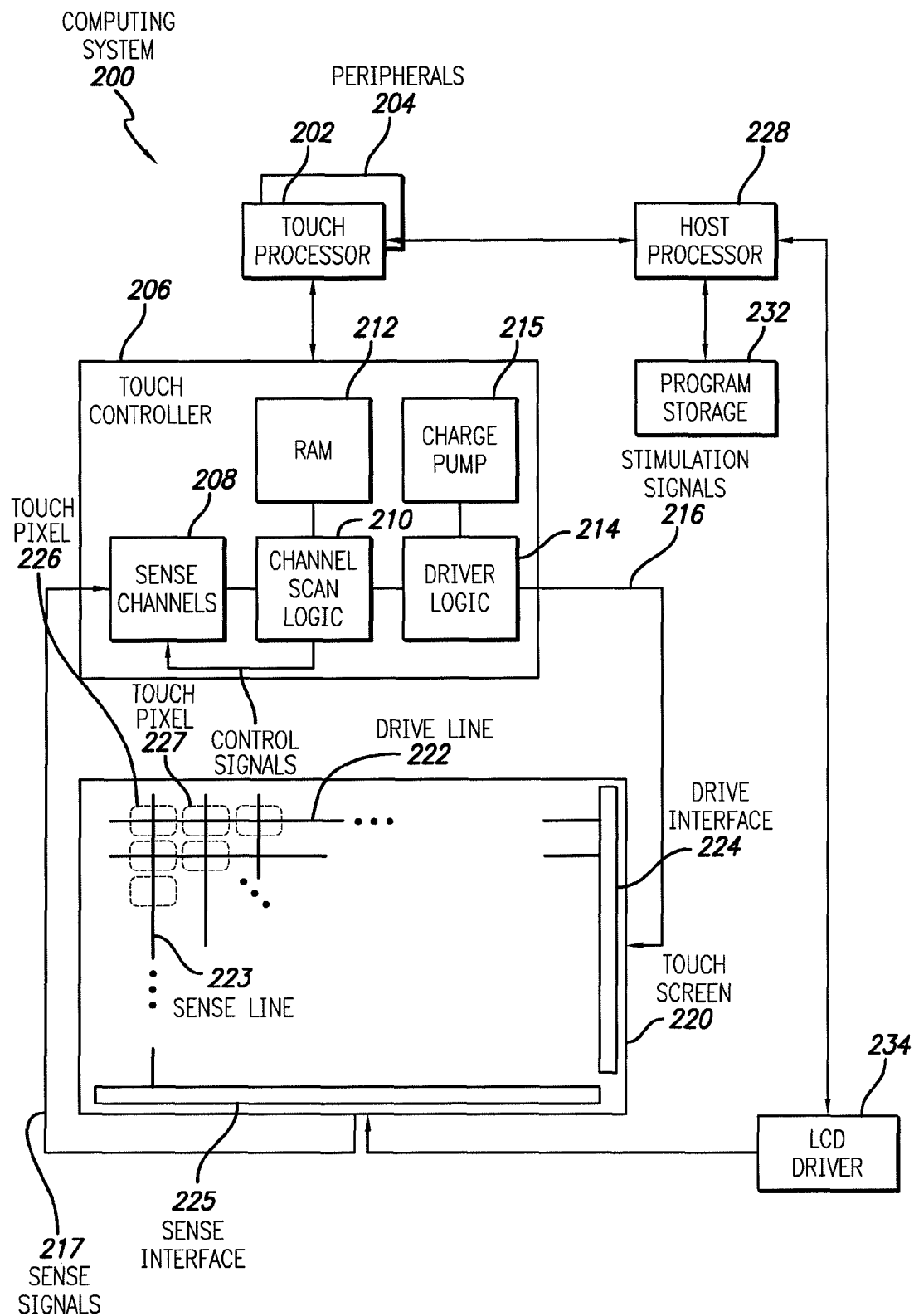
FIG. 2 is a block diagram of an example computing system that illustrates one implementation of an example integrated touch screen according to various embodiments.

FIG. 2 is a block diagram of an example computing system 200 that illustrates one implementation of an example integrated touch screen 220 according to various embodiments. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that includes a capacitive sensing medium having a plurality of drive lines 222 and a plurality of sense lines 223. It should be noted that the term "lines" is a sometimes used herein to mean simply conductive pathways, as one skilled in the art will readily understand, and is not limited to structures that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 are transmitted through a sense interface 225 to sense channels 208 (also referred to as an event detection and demodulation circuit) in touch controller 206. In this way, drive lines and sense lines are part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
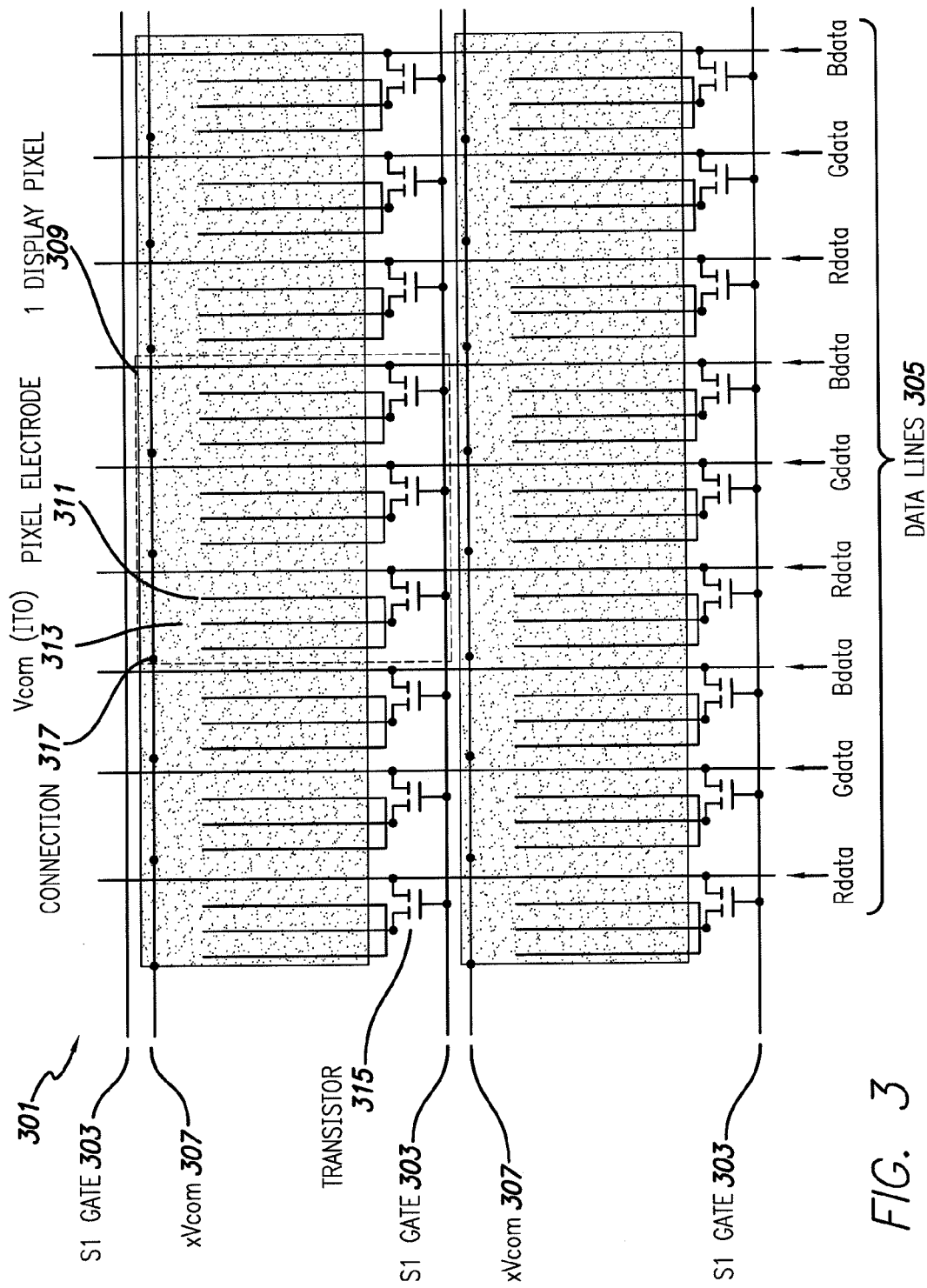
FIG. 3 illustrates an example fast field switching (FFS) LCD display.

FIG. 3 illustrates an example fringe field switching (FFS) LCD display 301. FIG. 3 includes a number of display pixels 309, each pixel can have three sub-pixels, one each of the colors red, green, and blue, for example. FIG. 3 also shows gate lines 303, data lines 305, and xVcom lines 307, as well as pixel electrodes 311 and common electrodes (Vcom) 313. Each Vcom 313 can be formed as a layer of ITO extending in the x-direction through a row of display pixels 309 of display 301. As shown in FIG. 3, Vcom 313 is shown overlaid upon three display pixels per row. Each sub-pixel of display pixel 309 includes a connection 317 that connects xVcom 307 to Vcom 313, allowing xVcom to supply a common voltage to Vcom. With the exception of connection 317, Vcom 313 is not in direct electrical contact with any other circuit element. Each sub-pixel includes a single thin film transistor (TFT) 315, although other switching configurations may also be employed. During the display phase of LCD display 301, TFTs 315 of individual rows of sub-pixels of display pixels 309 are switched on, allowing a voltage on the sub-pixel's data line 305 to be applied to pixel electrode 311. The voltages create electric fields between pixel electrodes 311 and Vcoms 313. The amount of light allowed through the sub-pixels (i.e., the brightness of each sub-pixel) may be controlled to create an image on LCD display 301 by controlling the interaction between the liquid crystal of the sub-pixels and the electric fields generated by the pixel electrodes and the common electrodes.

Figures 4A, 4B:
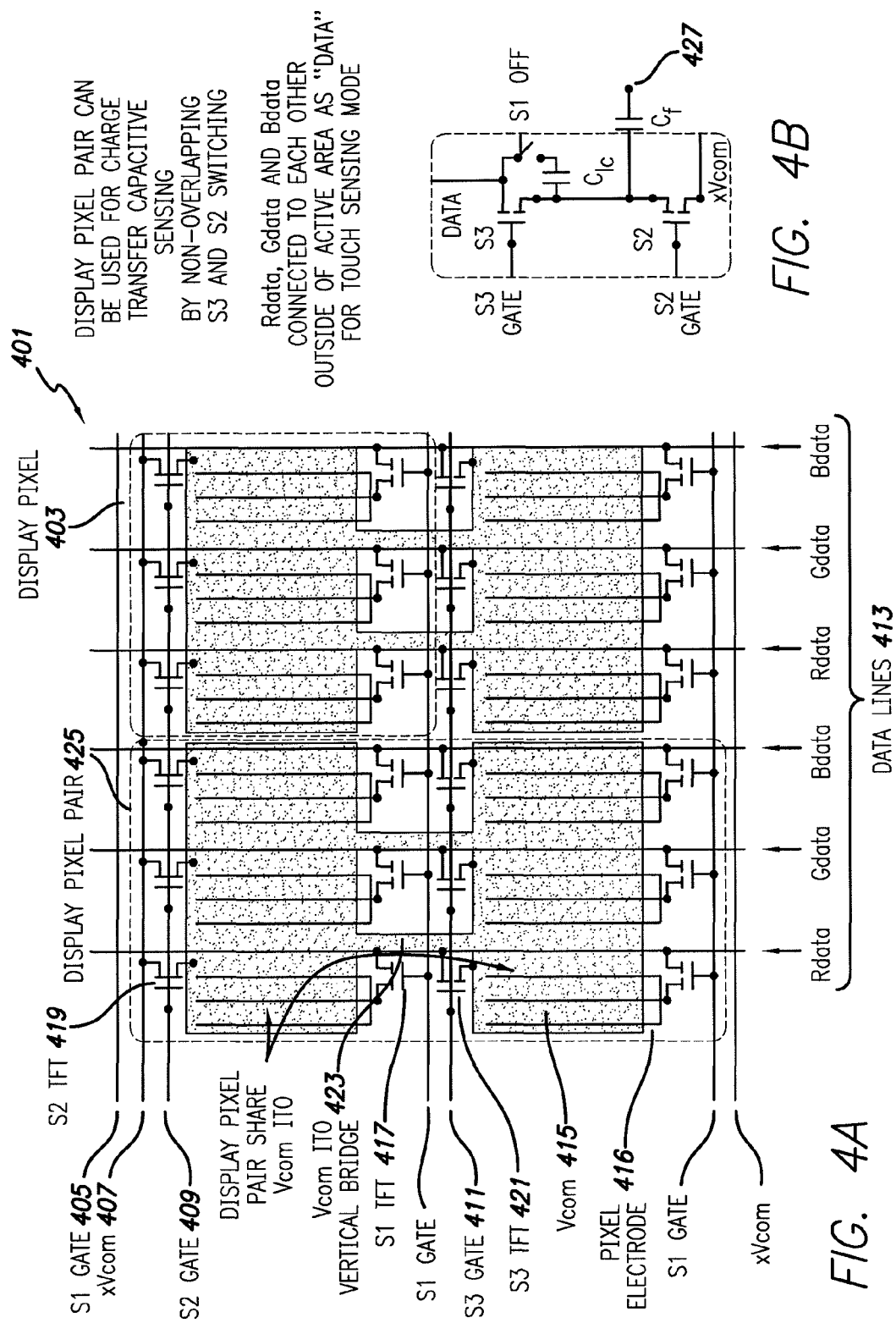
FIGS. 4A-4B show an example touch screen according to various embodiments.

Thus, common electrodes are circuit elements of the display system circuitry in the stackup (i.e., the stacked material layers forming the display pixels) of the display pixels of some types of known LCD displays, e.g., fringe field switching (FFS) displays, that operate as part of the display system to display an image. FIGS. 4A-B illustrate an example configuration in which common electrodes (Vcom) also form portions of the touch sensing circuitry of a touch sensing system according to various embodiments. In the example shown in FIGS. 4A-B, Vcom 415 can serve as a multi-function circuit element that operates as display circuitry of the display system of touch screen 401 and also operates as touch sensing circuitry of the touch sensing system. In this example, Vcom 415 can operate as a common electrode of the display circuitry of the touch screen, and can also operate together when grouped with other common electrodes as touch sensing circuitry of the touch screen. Using transistors S1, S2, and S3 in this example, the common electrodes can operate as charge collectors in a charge transfer capacitive touch sensing system. In some embodiments, a group of common electrodes can operate together as other portions of a touch sensing system, such as a capacitive part of a drive line or a sense line of the touch sensing circuitry during the touch sensing phase. Other circuit elements of touch screen 401, for example, transistors S1, S2, and S3, can form part of the touch sensing circuitry by, for example, electrically connecting together common electrodes 415 of a region, switching electrical connections, etc.

FIGS. 4A-4B show an example touch screen according to various embodiments. FIG. 4A illustrates a plan view of an example touch screen 401, which includes four pixels 403 that utilize multi-function circuit elements. The circuit elements can include, for example, structures that exist in known LCD displays, as described above. Circuit elements are not limited to whole circuit components, such a whole capacitor, a whole transistor, etc., but can include portions of circuitry, such as only one of the two plates of a parallel plate capacitor. FIG. 4A includes S1 gate lines 405, xVcom lines 407, S2 gate lines 409, S3 gate lines 411, data lines 413, pixel electrodes 416, common electrodes (Vcom) 415, an S1 transistor 417, an S2 transistor 419, and an S3 transistor 421. Common electrodes 415 are circuit elements that can serve as conductive portions of a touch sensing system, described in more detail below. Pixels 403 of touch sensor 401 also include Vcom bridges 423 that connect the Vcom of one pixel to the Vcom of an adjacent pixel to form a display pixel pair 425 with a shared Vcom pair. In the example configuration shown in FIG. 4A, Vcom bridge 423 is a vertical bridge that connects the Vcom of a top display pixel to the Vcom of a bottom display pixel.

In this example embodiment, each display pixel includes at least one switch that can connect the shared Vcom pair to a conductive line. In particular, each of the sub-pixels of the top display pixel in a display pixel pair 425 includes a switch (i.e., S2 transistor 419) that can connect the shared Vcom pair to an xVcom line, and each of the sub-pixels of the bottom display pixel in the display pixel pair includes a switch (i.e., S3 transistor 421) that can connect the shared Vcom pair to a data line. The switching of S2 transistors 419 and S3 transistors 421, as well as S1 transistors 417, into one configuration can allow circuit elements of the display circuitry to operate to display an image, while the switching of the transistors into another configuration can allow some of the circuit elements of the display circuitry to operate as touch sensing circuitry to sense touch.

More specifically, during a display phase, S1 transistor 417 performs switching of data lines 413 to connect the data lines to pixel electrodes 416, and S2 transistor 419 can be switched to connect the shared Vcom pair to xVcom lines 407 to allow the pixel to display images on the touch screen. During a touch sensing phase, S1 transistor 417 can be switched by a switch controller (not shown) to disconnect the data lines 413 from the pixel electrodes 416, and S2 transistors 419 and S3 transistors 421 can switch the shared Vcom pair to operate as part of a touch sensing circuitry. For example, S2 transistor 419 can be switched on/off by the switch controller to alternatively connect/disconnect Vcom 415 to xVcom lines 407, while S3 transistor 421 can be switched to alternatively connect/disconnect Vcom 415 to data lines 413, as described in more detail below.

FIG. 4B is a circuit diagram of example touch screen 401 representing the structures illustrated in FIG. 4A configured for touch sensing. FIG. 4B also includes a capacitor Cf, which represents a touch object 427 (e.g., a finger) in proximity to touch screen 401. The circuit shown in FIG. 4B can be operated as a charge transfer capacitive sensor, for example, by non-overlapping the switching of switched S3 and S2 (while leaving S1 open) thereby causing the shared Vcom to act as a conductive portion of the touch sensing circuitry, a charge collector in this example, as described in more detail below. In this regard, data lines 413 may be connected to each other in the border of the touch screen. The lines may be connected using various switching configurations described in U.S. Patent Application No. 61/149,267, entitled "DUAL CONFIGURATION FOR DISPLAY DATA LINES," filed on Feb. 2, 2009, the contents of which are incorporated herein by reference.

In this example embodiment, Vcom vertical bridge 423 connects the Vcom of two display pixels adjacent in the vertical direction. In other embodiments, bridges can connect more than two display pixels. Connecting pixels to form display pixel pairs may provide some advantages, such as reducing the number of additional conductive lines and other circuit elements that may be needed. In this example embodiment, for instance, connecting the common electrodes of adjacent display pixels can reduce the number of switches per display pixel needed to operate the common electrodes as part of touch sensing circuitry. More specifically, this embodiment uses six switches (i.e., one S2 and one S3 for each of three sub-pixels) to operate a single structure of ITO as a charge collector in a charge transfer capacitive touch sensing system. Because the single ITO structure (the shared Vcom) is shared between two display pixels, the six switches can be located in different display pixels. Thus, three switches need to be added to each display pixel in order to operate this example configuration of touch sensing circuitry. In contrast, if the common electrodes are not connected together and shared between display pixels, the six switches would need to be added to each display pixel. Therefore, in this example, connecting common electrodes allows the number of switches added per display pixel to be reduced by half.

In general, each of the touch sensing circuit elements may be either a multi-function circuit element that forms part of the touch sensing circuitry and performs one or more other functions, such as forming part of the display circuitry, or may be a single-function circuit element that operates as touch sensing circuitry only. Similarly, each of the display circuit elements may be either a multi-function circuit element that operates as display circuitry and performs one or more other functions, such as operating as touch sensing circuitry, or may be a single-function circuit element that operates as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

In addition, although example embodiments herein describe the display circuitry as operating during a display phase, and describe the touch sensing circuitry as operating during a touch sensing phase, it should be understood that a display phase and a touch sensing phase may operated at the same time, e.g., partially or completely overlap, or the display phase and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

FIG. 5 illustrates an example method of sensing touch by charge transfer in the circuit of FIG. 4B. In this method, the data lines 413 are driven by a voltage drive 501, and the xVcom lines are connected to a charge sensing circuit 503 and used to sense touch. Voltage drive 501 outputs a drive voltage to data line 413. At this point, the S3 gate closes (i.e., transistor S3 is turned on) while S2 remains open (i.e., transistor S2 is off), thus charging Vcom 415 to the voltage provided by the voltage drive.

Touch object 427 is at an AC ground, so charging the Vcom to the drive voltage charges the capacitor labeled Cf to a voltage that appears across Cf. The amount of charge held in Cf is proportional to the capacitance of Cf. During the sensing phase, S3 gate is turned off (i.e., transistor S3 is open) and S2 gate is turned on (i.e., transistor S2 is closed), and the S2 transistor then connects the Vcom plates to charge sensing circuit 503, which can include, for example, a larger capacitor than that of the Vcom plates, or the charge sensing circuit may be of another type. In this regard, there are many different charge sensing circuits, such as circuits that operate by measuring a charge that is required to bring a measured point to a fixed voltage, e.g., a virtual ground operational amplifier (op amp). When a charge sensor is used, the amount of charge that is transferred to the sense line during the S2 closed timeframe is proportional to Cf. That process is repeated, possibly many times, and the total amount of charge is measured. The total amount of charge is proportional to Cf. Thus, the Vcom of each display pixel pair operates as a charge collector in the above-described example charge transfer capacitive sensing system.

FIG. 6 shows another example method of sensing touch by charge transfer in the circuit of FIG. 4B. The configuration of FIG. 6 is similar to FIG. 5, except that voltage drive 501 drives the xVcom line, and charge sensor 503 is connected to the data lines (vertical). After this difference is taken into account, the operation of the configuration of FIG. 6 is similar.

For some embodiments, the charge sensor and the voltage drive could be interchangeably connected to the data and xVcom lines through, for example, switches in the border. This might be helpful if there is an artifact that is associated with one configuration, but not the other. In this regard, changing the configuration may help to reduce the artifact.

Many display pixel pairs can be grouped together to form touch pixels that could be sensed in unison, i.e., all potentially contribute to a sense signal. In different embodiments, the number, size, shape, etc. of touch pixels can be different. In some embodiments, the touch pixel could be, for example, 5 mm by 5 mm in area, which typically provides adequate spatial resolution to discern touches of human fingers. In addition, the touch pixels may be grouped differently depending on the application. Grouping can be accomplished by connecting more of the pixels' Vcom together, for example, through bridges such as vertical bridges 423 described above. In another embodiment, the grouping can be done in the border of the touch screen by hard-wiring the circuit elements together, for example. In other embodiments, the grouping can be done by switches in the border, and can be, for example, programmable to change the size, shape, etc., of the groupings. Programmable groupings could be used in far-field detection such as described in U.S. Patent Publication 2008/0309631, entitled "INTEGRATED MULTI-TOUCH SURFACE HAVING VARYING SENSOR GRANULARITY," published Dec. 18, 2008, the contents of which are incorporated herein by reference.

In some embodiments, regions may be reconfigurable, for example, to allow pixels to be grouped into regions of different sizes, shapes, etc. For example, some embodiments may include programmable switching arrays to allow reconfigurable switching schemes to group display pixels into regions of different sizes depending on, for example, variations in environmental noise, size and/or distance of the object to be sensed from the touch screen, etc. Other aspects of configurations that allow grouping may not be reconfigurable, for example, physical breaks in lines in the stackup of a display pixel are not reconfigurable. However, a touch screen configuration including physical breaks, for example, may still allow reconfigurable grouping of display pixels into differently sized, shaped, etc., regions by including other circuit elements that are reconfigurable, such as programmable switches, signal generators, etc.

In some embodiments, the drive lines and/or sense lines can be formed of other structures including, for example other structures already existing in known LCD displays (e.g., other electrodes, conductive and/or semiconductive layers, metal lines that would also function as circuit elements in a known LCD display, for example, carry signals, store voltages, etc.), other structures formed in an LCD stackup that are not known LCD stackup structures (e.g., other metal lines, plates, whose function would be substantially for the touch sensing system of the touch screen), and structures formed outside of the LCD stackup (e.g., such as external substantially transparent conductive plates, wires, and other structures). For example, part of the touch sensing system can include structures similar to known touch panel overlays. Forming a touch sensing system in part or in whole using structures that already exist in displays can potentially increase the image quality, brightness, etc. of the touch screen by reducing the amount of structure dedicated primarily to touch sensing that would typically overlay the display.

Grouping of display pixels to form touch pixels can be determined by the spatial resolution desired for the application. For example, for detecting the touch of a human finger, a 5mm pitch may be adequate for most applications. In a touch pixel of some applications, for example, there can be 32×64 display pixel pairs, which would be about 1800 total display pixel pairs. There can be 64 columns of display pixel pairs within one touch column, and there can be 32 rows of display pixel pairs within a touch row group.

Figure 7:
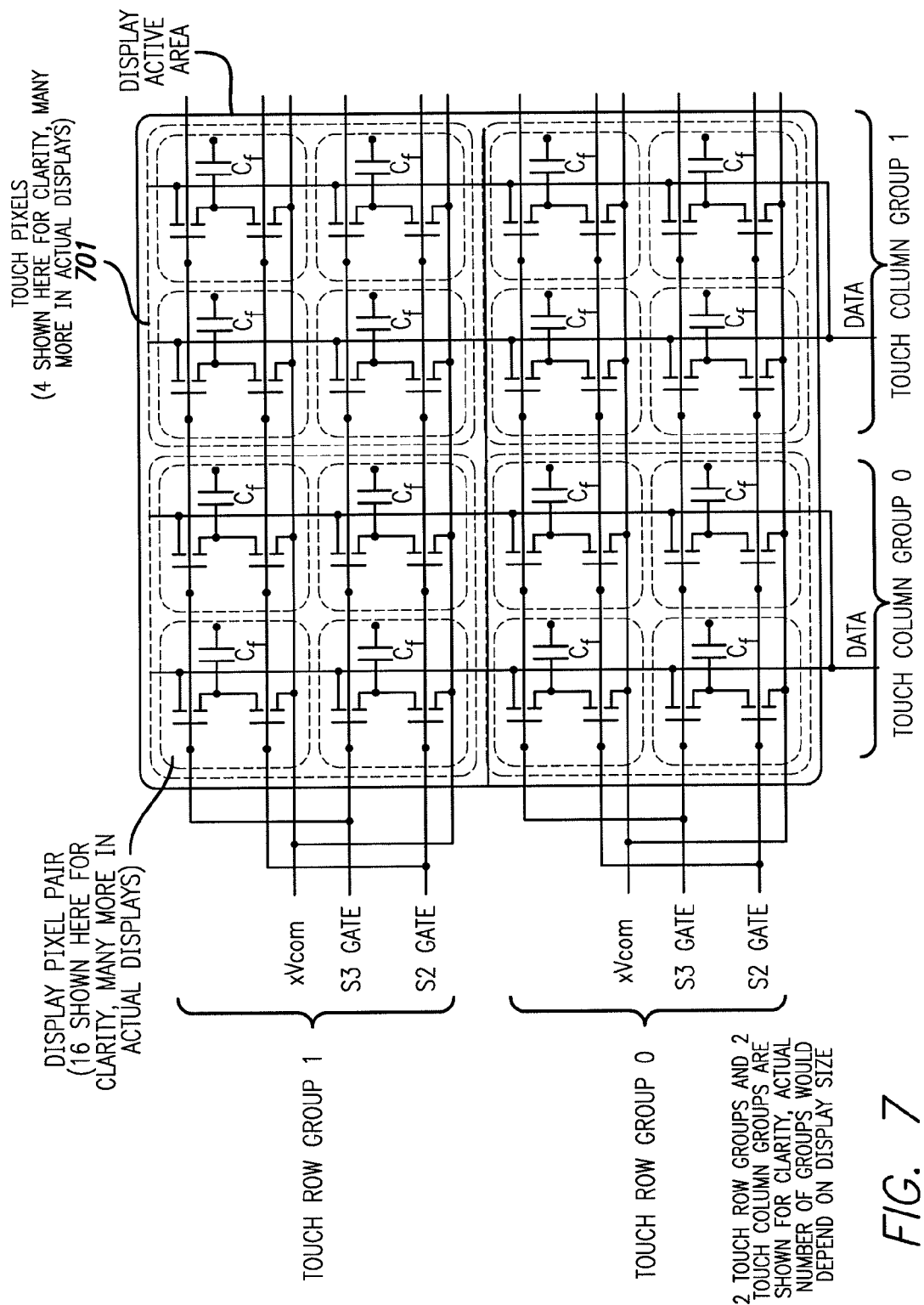
FIG. 7 shows an example grouping of display pixel pairs according to various embodiments.

FIG. 7 shows an example grouping of display pixel pairs to form touch pixels according to various embodiments. Note that in FIG. 7, the S1 gate lines and transistors are not shown for the purpose of clarity. FIG. 7 shows sixteen total display pixel pairs grouped into four touch pixels 701, that is, 4 touch pixels, each having 4 display pixel pairs. During touch sensing, rows of display pixel pairs are connected in touch row groups with a common S2 gate, S3 gate and xVcom lines. Grouping connections may be made in different configurations, for example, hard-wiring in the touch screen border, transistor switches in the border, transistor switches in driver electronics, etc. During touch sensing, columns of display pixel pairs are connected to form touch column groups with common data lines. In some embodiments, data lines must be uniquely addressable when transferring data to the sub-pixels during the display phase, therefore hardwiring techniques to group display pixel pairs would not be used.

Figure 8A:
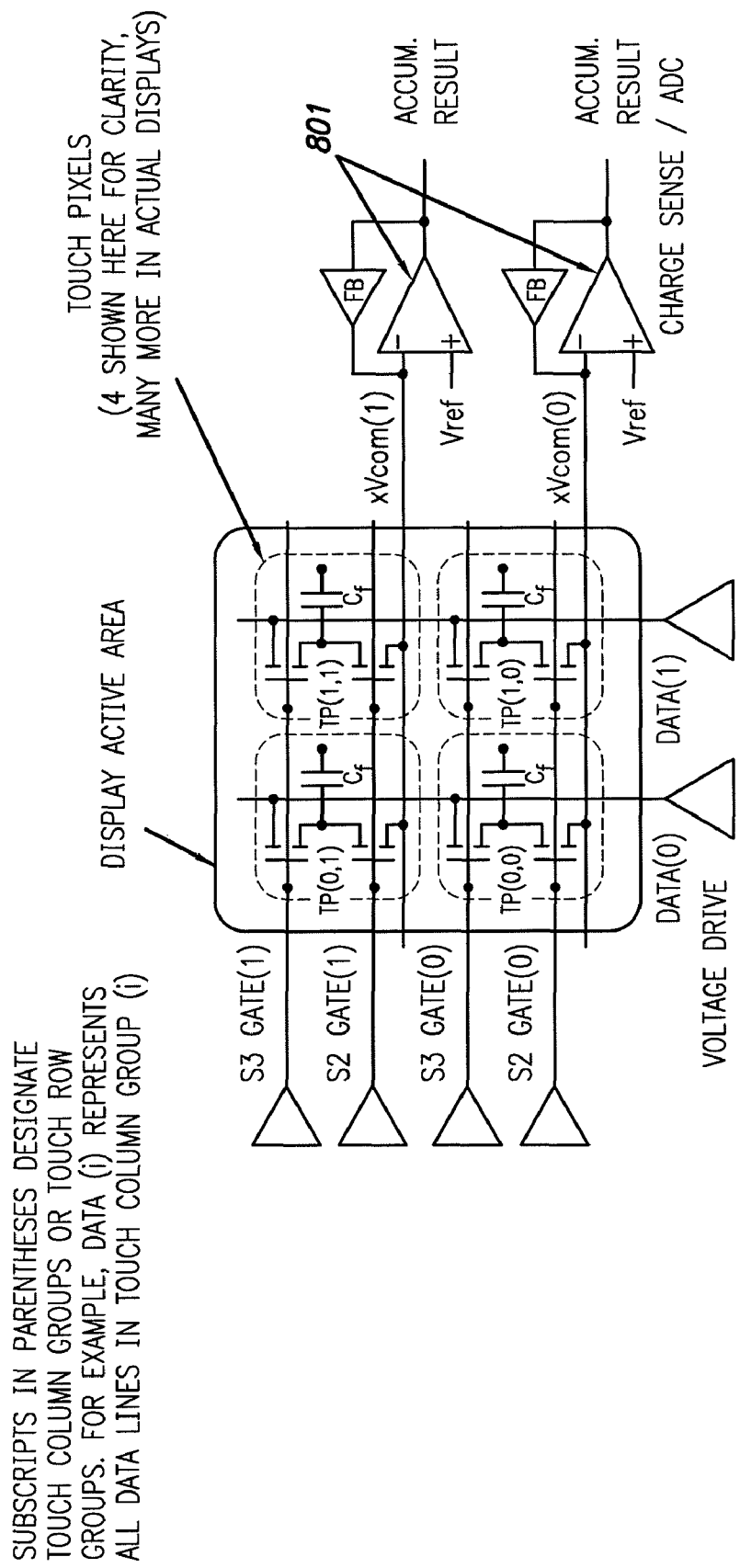
FIGS. 8A-B illustrate an example operation of a touch sensing system according to various embodiments.
Figure 8B:
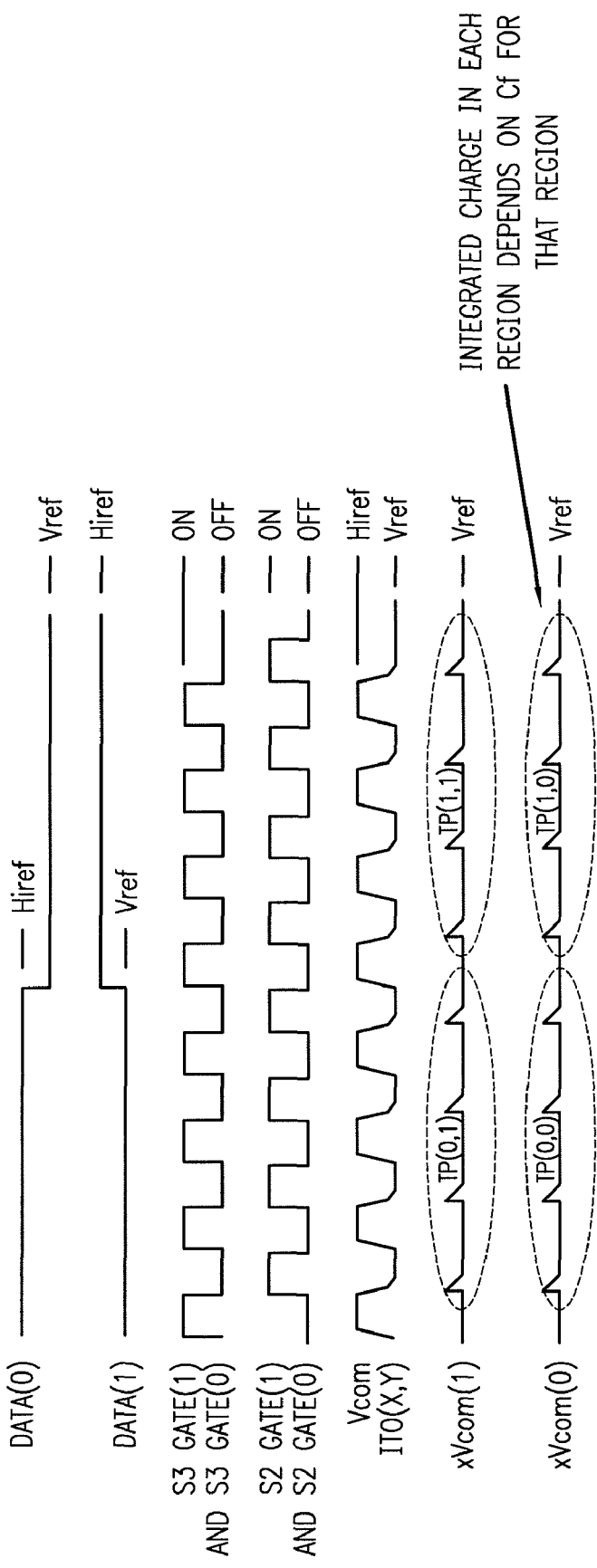

FIGS. 8A-B illustrate an example operation of a touch sensing system according to various embodiments. In FIG. 8A, the circuit diagrams of the touch pixels of FIG. 7 have been simplified to the representation of a single circuit because all of the S3 transistors are connected and controlled in parallel, and therefore, all of the Vcoms can be represented as a single node because they simultaneously share a common connection. In this way, the individual Vcom charge collector structures of each display pixel pair can be used together to form a larger charge collector in a charge transfer sensing system. The sense system includes charge amplifiers 801, which include a feedback (FB) that could be resistive, capacitive, switched current source, etc. In this example, the feedback loop is a negative feedback loop, which maintains an average voltage at the input at substantially equal to Vref. This example embodiment uses a configuration similar to the configuration of FIG. 5, in which data lines are driven and Vcom is used to sense touch. In FIG. 8A-B, numbers in parentheses designate a corresponding touch column group or touch row group. For example, data(1) represents all data lines in touch column group 1, and xVcom(1) represents all xVcom lines in touch row group 1. It is noted that in this embodiment, in which data lines are being driven, hardwiring can be used in the border (i.e., switches may not be required). In this approach, the output buffer of the LCD driver (not shown) that drives the display phase of the touch screen may be programmed to provide the appropriate signals for the touch phase. In particular, the output buffer could be programmed to drive all of the data lines (touch columns) at the same voltage. Using the LCD driver could provide an additional advantage in that the common mode would not have to be matched. In other words, the average DC voltage at which the LCD driver operates would be the same DC voltage used in producing the touch waveforms, therefore, potential mismatches in the common mode might be reduced.

FIG. 8B illustrates signals of an example operation of the touch sensing system of FIG. 8A. In general, sensing occurs throughout a time frame. FIG. 8B shows example waveforms in the system during one time frame. As shown in the bottom two waveforms (labeled xVcom(1) and xVcom(0)), charge is sensed in the touch pixels (TP) (0,1) and (0,0) (i.e., the upper-left and lower-left touch pixels (TP) of FIG. 8A) in a first half of a time frame, and in the last half of the time frame, touch pixels (1,1) and (1,0) (i.e., the upper-right TP and the lower-right TP) are sensed. Thus, at any given time, touch sensing is occurring in a column of touch pixels.

In the example of FIG. 8B, data(0) remains at a voltage Href for half of the waveform shown, and the S3 gates follow the S3 waveform shown, which is to turn on first, then to turn off, and after a slight amount of time, the S2 gate turns on for a period of time, and then turns off, and after a slight amount of time, S3 turns on, and the process repeats with the gates not overlapping. Referring to the Vcom waveform, the Vcom voltage is charged to Href during the time the S3 gates are on, and then when the S2 gates are on, the Vcoms are connected to the charge-sensing xVcom lines. Thus, as shown in FIG.

8B, voltage of the Vcom tapers down as charge flows out of that ITO plate through the S2 transistors into the xVcom lines and the charge is sensed by the charge amplifiers such that they converge on the Vref voltage. In some embodiments, Href can be 5 V and Vref can be 2.5 V.

The voltages at the xVcom lines are shown by the bottom two waveforms labeled xVcom(1) and xVcom(0). During most of the time frame, the voltages of xVcom(1) and xVcom(0) are approximately Vref, because of the negative feedback behavior of the charge amplifiers. However, when the S2 transistors are closed, the voltages on the xVcom lines will momentarily rise because it takes some reaction time for the charge sensors to provide the feedback to lower the voltage back to the Vref level. The negative feedback behavior of the charge amplifiers pulls charge out of the xVcom lines and measures how much charge is pulled out. The amount of charge total that is pulled out gets accumulated in, for example, a result capacitor. In some embodiments, a charge sense ADC may be used to accumulate the charge and output a digital result. The value of the accumulated charge is proportional to the capacitance of interest (i.e., caused by a sensed touch).

In any given portion of a time frame, touch can be sensed using only a single column by, for example, accumulating charge with that column while limiting or reducing the accumulation of charge by other columns. For example, in the first half of the time frame shown in FIG. 8B, while touch column group 0 is used to accumulate charge as described above, the voltage of the data(1) lines can be set to Vref, so that while the S3 transistors are closed, voltage Vref is applied to the Cf capacitors in touch column group 1 (i.e., TP(1,1) and TP(1, 0)). As a result, when the touch pixels are switched from the data(1) lines to the xVcom lines by opening the S3 transistors and closing the S2 transistors, the net change in voltage across the Cf capacitors in touch column group 1 is zero because the voltage applied to the Cf capacitors does not change when switched from the data(1) line, which are at Vref, to the xVcom lines, which are also at Vref. In other words, the capacitance of the Cf capacitors in touch column group 1 does not contribute to the result during the first half of the time frame.

In the second half of the time frame, the voltage of data(1) is set to Href and the voltage of data(0) is set to Vref. Thus, the second half of the time frame is identical to the first half except now measuring data(1) and not data(0).

Figure 9A:
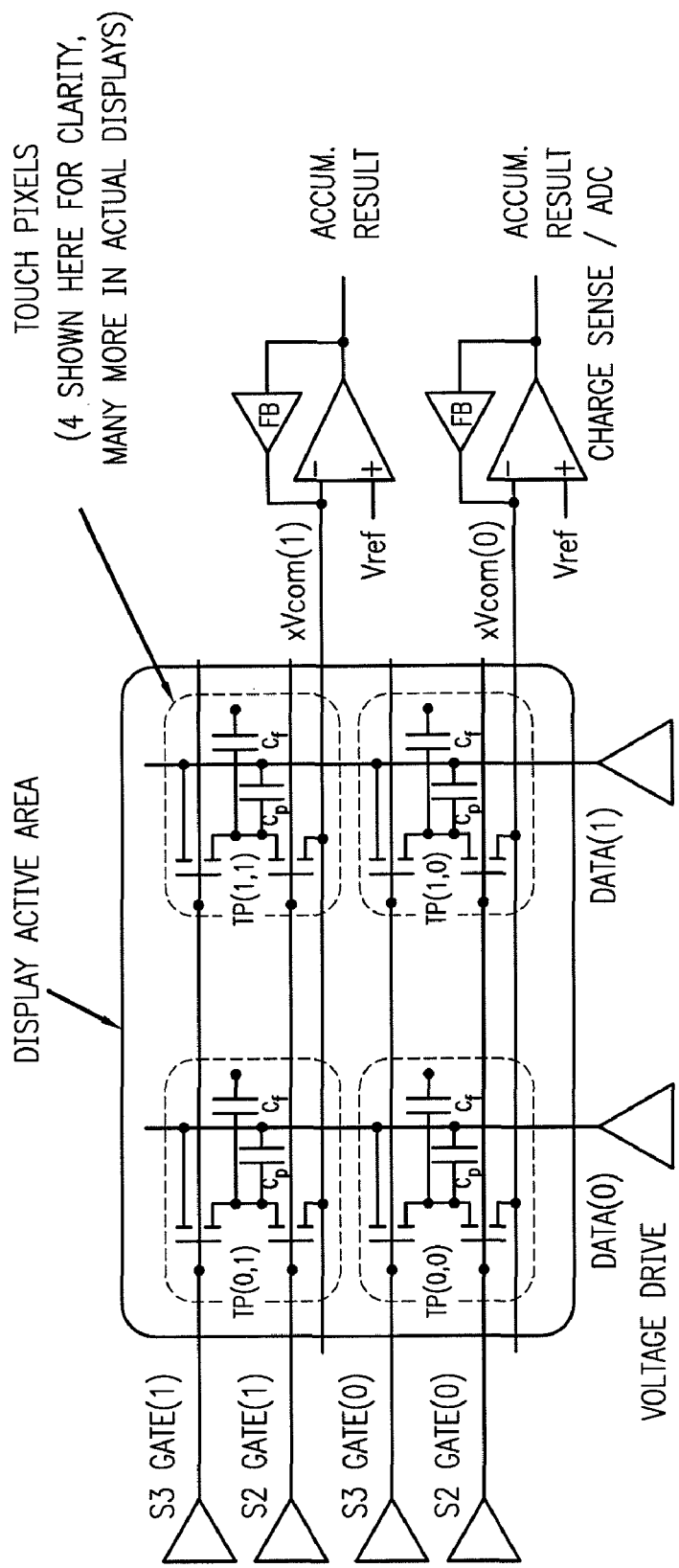
FIGS. 9A-B illustrate another example touch sensing system and touch phase operation according to various embodiments.
Figure 9B:
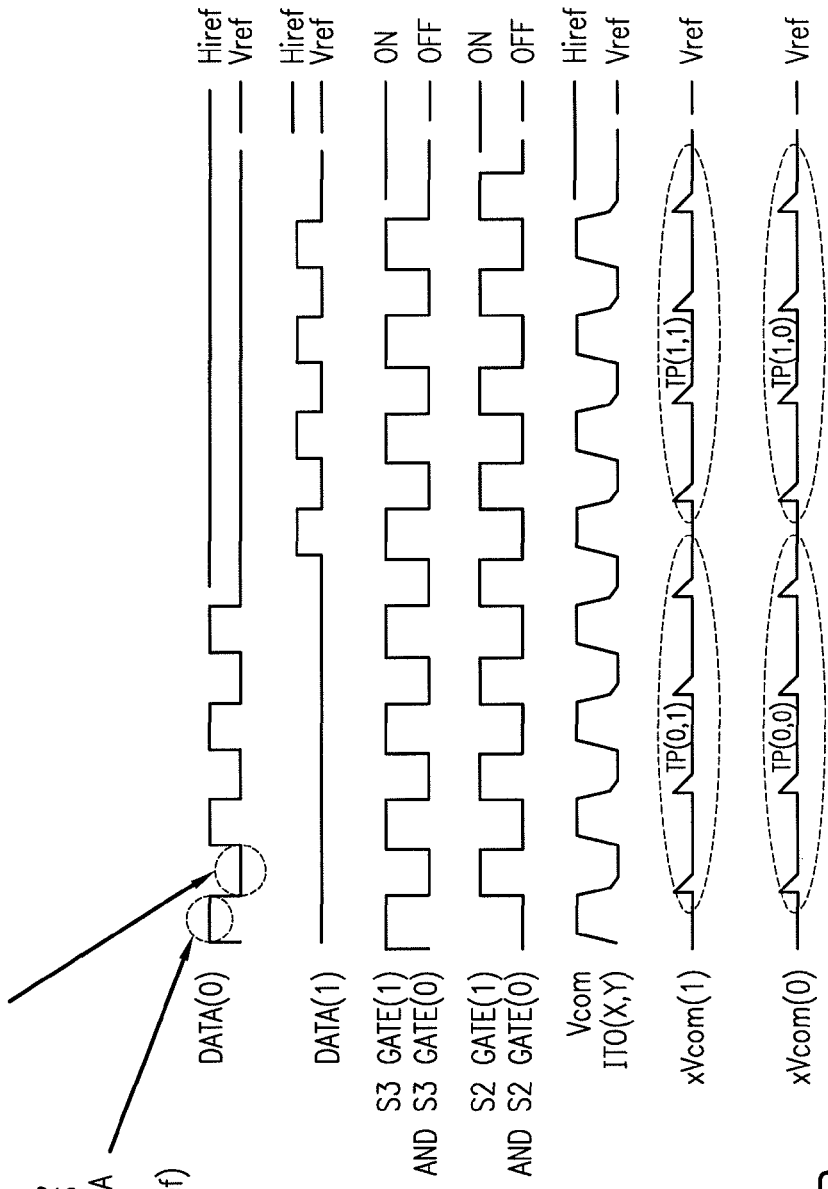

FIGS. 9A and 9B illustrate another example touch sensing system and touch phase operation according to various embodiments. In this embodiment, a parasitic capacitance, Cp, between the Vcom and the data lines may be reduced. The touch sensing system of FIGS. 9A-B uses a modified waveform to drive the data lines. The resulting waveform (labeled Vcom ITO(x,y) in FIG. 9B) is a modulated waveform that is in sync with the S3 gate waveform, which travels in magnitude from Href to Vref. When S3 is on, voltage across Cp is zero (data and Vcom are both at Href). Therefore, the capacitance during the first timeframe when S3 is on, and the voltage across the capacitors of the measured pixels will be zero. When switch S2 is closed, the data lines are driven to the Vref level. This can help maintain a net zero voltage change across the Cp capacitors, which represent a parasitic capacitance between the Vcom and the data lines. Therefore, because the voltage across Cp hasn't changed, the parasitic charge contributed to touch Cf charge measurement is reduced.

In FIGS. 8A-B and 9A-B, the total amount of charge being measured is DC in quantity because the demodulation is done directly in the pixel, so the system is charging to a voltage, then transferring the charge to a charge amplifier for measurement. When the charge is transferred, the charge is flowing in one direction (from the pixel of interest through the xVcom lines into the charge sensor. Therefore, the total amount of capacitance being measured is a DC quantity, and charge is flowing in one direction only (as can be seen from the last two waveforms in FIGS. 8B and 9B, which show sawteeth on the waveform pointing up.

Figure 10A:
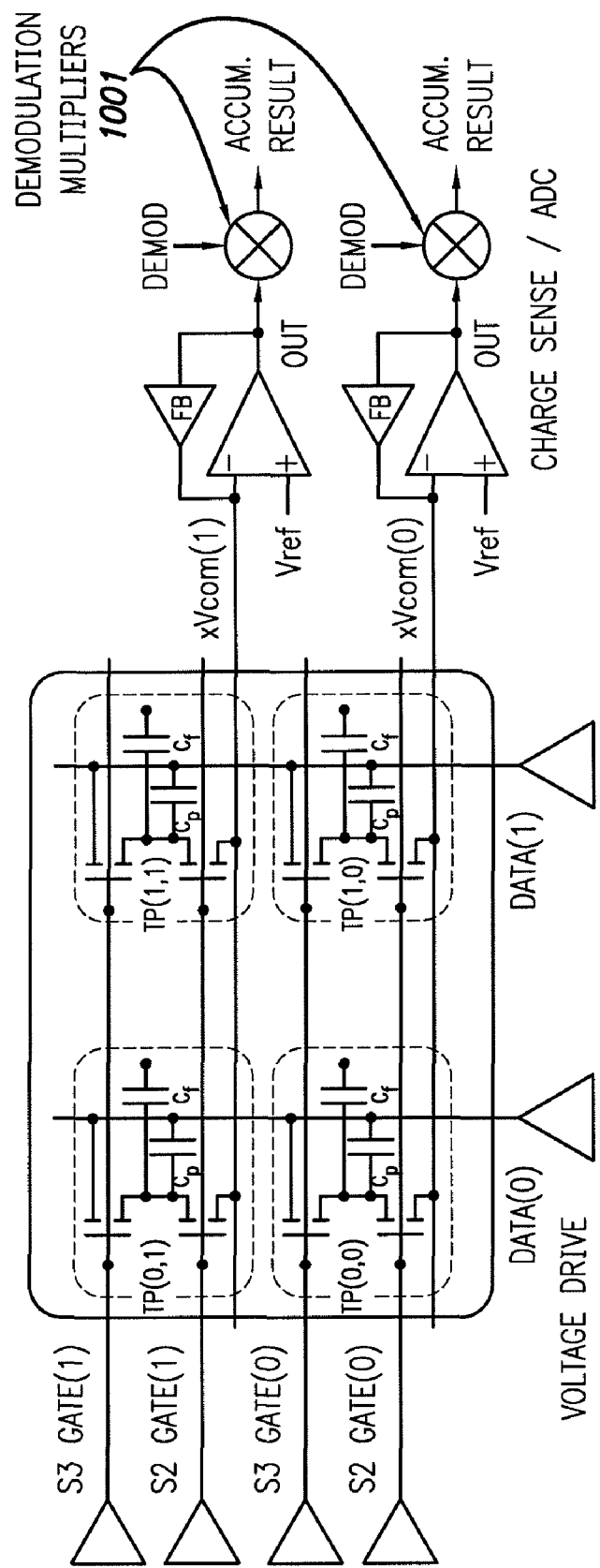
FIGS. 10A-B illustrate another example touch sensing system and touch phase operation according to various embodiments.
Figure 10B:
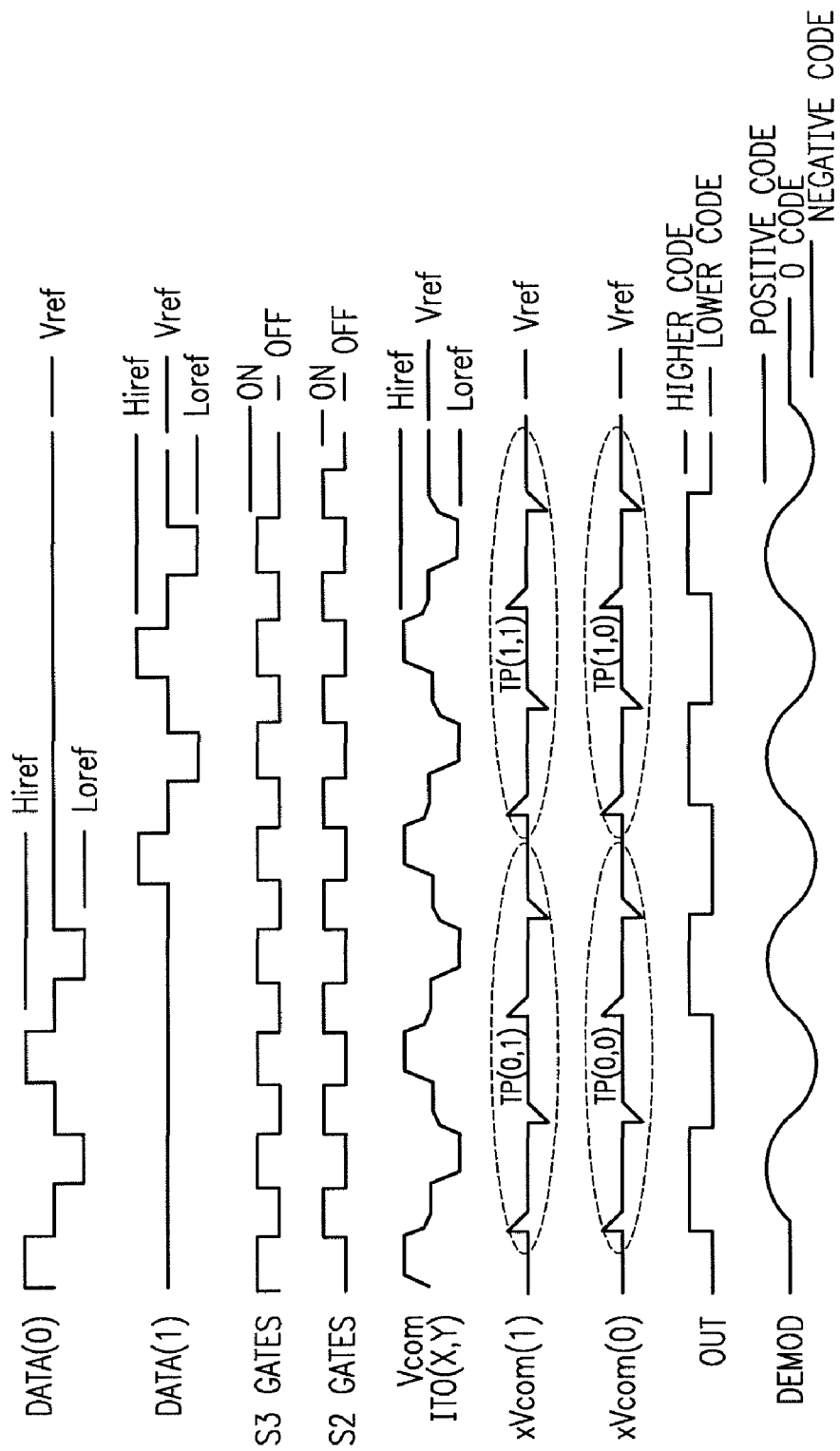

FIGS. 10A and 10B show another example configuration according to various embodiments. The embodiment of FIGS. 10A-B may facilitate handling or rejecting error signals, such as a leakage current. FIGS. 10A-B shows an embodiment that includes full-range demodulation, e.g., the data lines are being modulated both above and below Vref. The switching operation can be similar to previous embodiments shown in FIGS. 8-9, but Vcom is now transferring both positive and negative charge. This can be seen in the xVcom waveforms as positive and negative spikes for positive and negative charge. In this regard, the signal is essentially an AC signal. As measured touch increases, the size of the spikes change, thus the amplitude of the waveform is modified dependent on the sensed touch. This can allow the use of demodulation techniques such as using a demodulation multiplier 1001 in the digital domain, for example, as shown on the upper right of FIG. 10A. An example digital demod waveform (i.e., demod) is shown in FIG. 10B, as well as an example coding waveform (i.e., out). By using an appropriate demod waveform, out of band signals and noise can be reduced. In addition, the ability to demodulate waveforms on the sense channels can allow for a multiple stimulation approach to touch sensing. In some embodiments, other modulation/demodulation schemes, such as code division multiple access (CDMA), including, for example, using Gold sequence which can improve the noise rejection performance of the touch sensing, frequency modulation (FM) techniques, etc.

Figure 11:
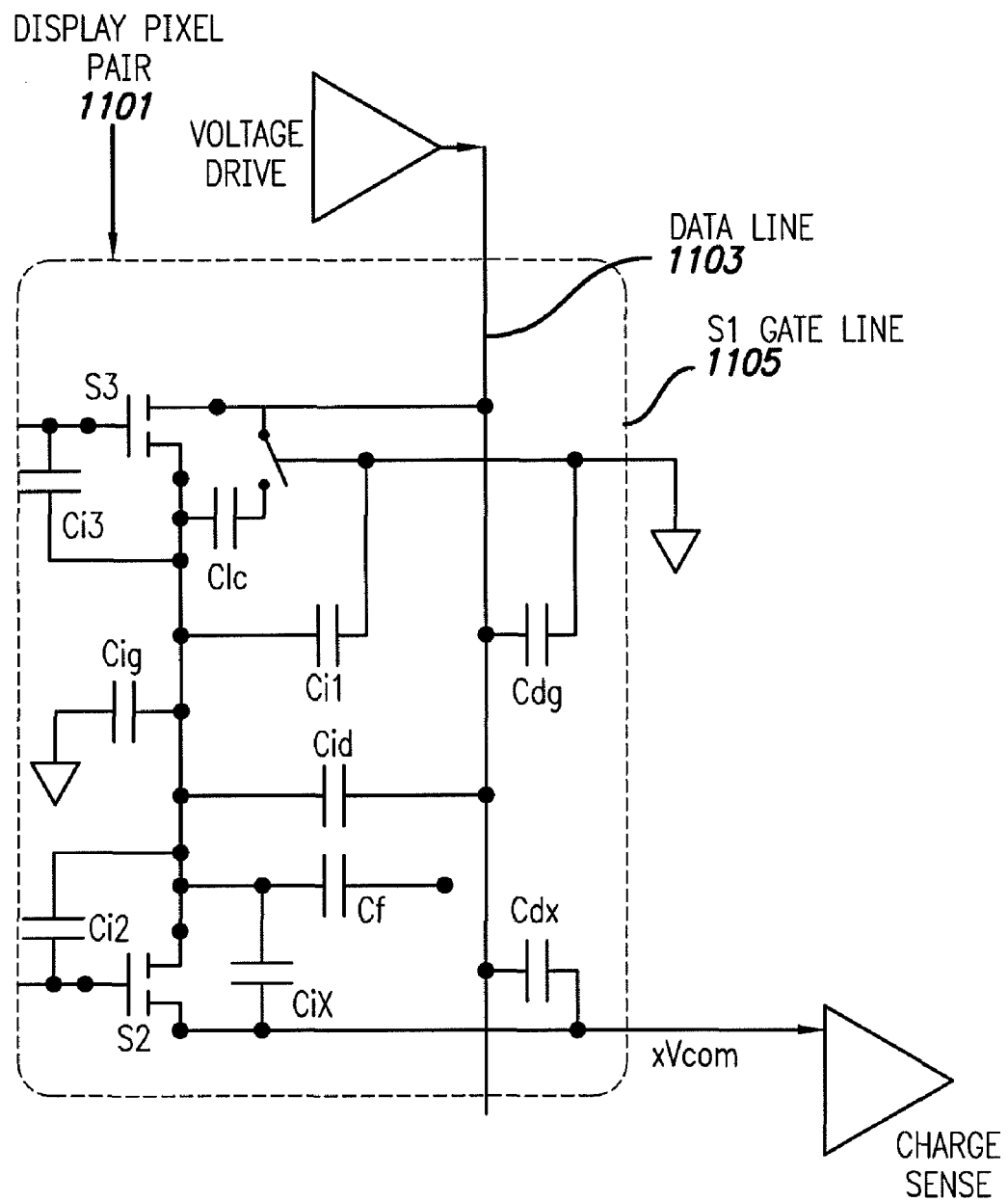
FIG. 11 is a circuit diagram of an example display pixel pair according to various embodiments.

FIG. 11 is a circuit diagram of an example display pixel pair 1101 according to various embodiments. FIG. 11 illustrates some of the parasitic capacitances that can exist in such a system that can negatively affect the bandwidth of touch sensing operations. In particular, FIG. 11 shows that parasitic capacitances may occur between the following structures: Vcom ITO and S1 TFT (Ci1); Vcom ITO and S2 TFT (Ci2); Vcom ITO and S3 TFT (Ci3); Vcom ITO and an S1 gate line 1105 (Cig); Vcom ITO and a data line 1103 (Cid); Vcom ITO and xVcom (Cix); a data line and a gate line (Cdg); and a data line and xVcom (Cdx).

Figure 12A:
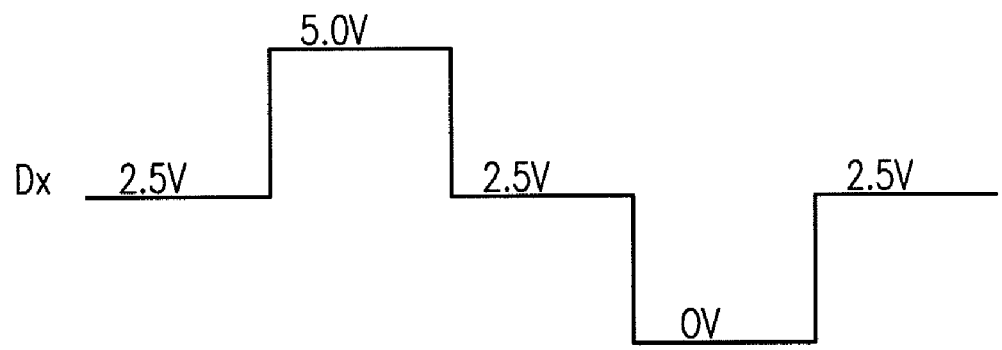
FIGS. 12A and 12B show two example waveforms that may be applied to a data line and a gate line of an example touch sensing system that may reduce a parasitic capacitance of the system.
Figure 12B:
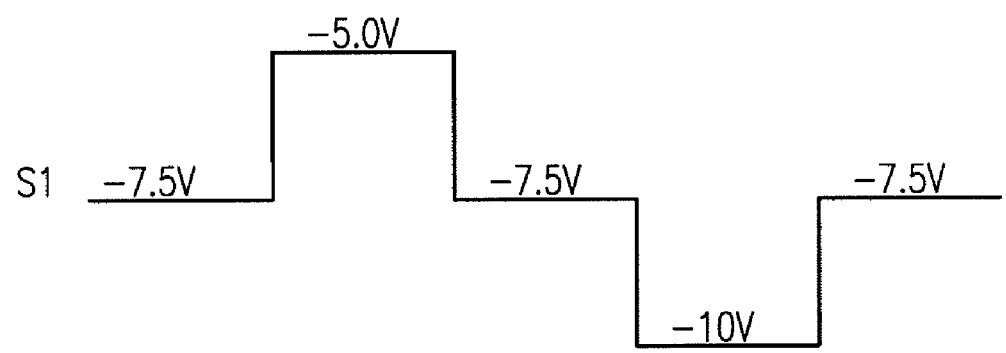

FIGS. 12A and 12B show two example waveforms, a Dx waveform and an S1 waveform, that may be applied to data line 1103 and S1 gate line 1105, respectively, that may reduce the parasitic capacitance Ci1 shown in FIG. 11. In particular, the Dx and S1 waveforms and voltages are such that a constant gate to source voltage of the S1 transistor can be maintained while the source voltage is changing. This may be accomplished by a technique referred to as bootstrapping. The result is that capacitor Ci1 sees no change in voltage, and hence generates no parasitic capacitance. This method may be applied to reduce or eliminate other parasitic capacitances in the system as well.

Figure 13:
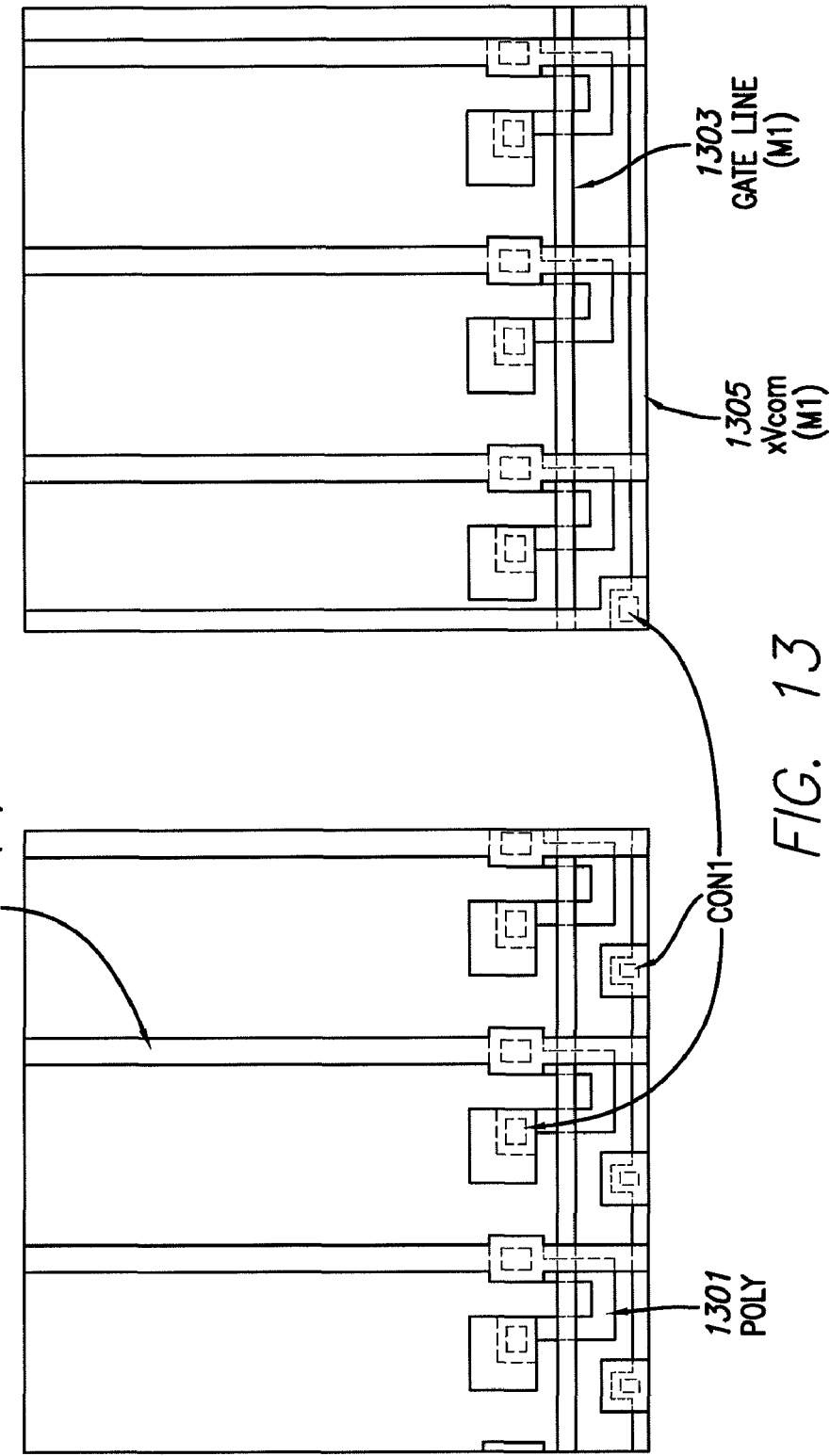
Figure 14:
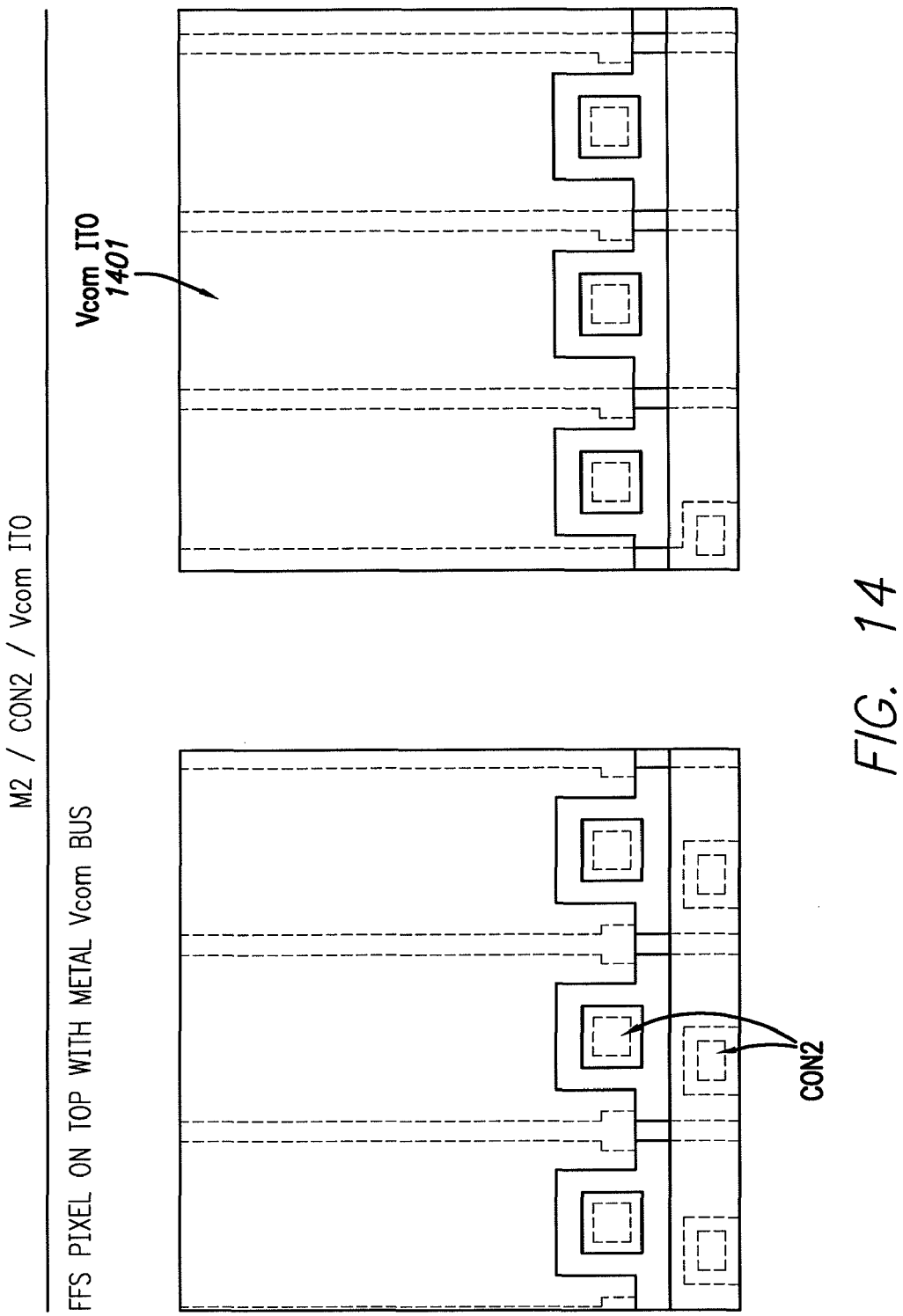

FIGS. 13-15 show an example touch screen pixel stackup and a manufacturing process for making the pixels according to various embodiments. FIG. 13 shows earlier stages of processing, including formation of a poly-Si layer 1301, a gate line 1303 and an xVcom line 1305 in an M1 layer, connections in a first connection (CON1) layer, and data lines 1307 in an M2 layer.

FIG. 14 shows middle stages of processing, including formation of connections in a second connection (CON2) layer, and a Vcom 1401. FIG. 15 shows later stages of processing, including a third connection (CON3) layer and pixel electrode 1501.

Although various embodiments have been fully described with reference to the accompanying drawings, it is to be noted that various changes and modifications will become apparent to those skilled in the art.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

What is claimed is:

1. A touch screen comprising:
    a group of display pixels, each display pixel including display circuitry that includes a circuit element; and
    touch sensing circuitry in one or more of the display pixels including
        a conductive portion that includes one of the circuit elements wherein the conductive portion is a common electrode,
        first and second conductive lines, each of the first and the second conductive lines extending from the display pixel to an outer edge of the group of display pixels,
        a first switch that connects and disconnects the first conductive line to the conductive portion, and
        a second switch that connects and disconnects the second conductive line to the conductive portion.

2. The touch screen of claim 1, wherein the circuit elements include common electrodes.

3. The touch screen of claim 1, wherein each of the first conductive lines is electrically connected to a plurality of first switches.

4. The touch screen of claim 1, wherein the second conductive lines include data lines of the display circuitry.

5. The touch screen of claim 1, wherein the first switch is a thin film transistor.

6. A touch screen system including the touch screen of claim 1, and further comprising:
    a voltage drive that outputs a voltage to the second conductive line;
    a switch controller that controls the first and second switches in accordance with the output voltage to generate a charge on the conductive portion, wherein an amount of charge generated is based on an amount of touch proximate to the conductive portion, and to transfer the charge to the first conductive line; and
    a charge sensing circuit that detects the amount of charge transferred to the first conductive line.

7. The touch screen system of claim 6, wherein the switch controller controls the first and second switches to connect the second conductive line to, and to disconnect the first conductive line from, the conductive portion when the voltage drive outputs the voltage, and controls the first and second switches to disconnect the second conductive line from, and to connect the first conductive line to, the conductive portion to transfer the amount of charge generated by the voltage to the first conductive line.

8. The touch screen of claim 1, wherein the conductive portion includes the circuit element of a first display pixel electrically connected by a bridge to the circuit element of a second display pixel.

9. The touch screen of claim 8, wherein the first and second display pixels are adjacent to each other.

10. The touch screen of claim 8, wherein the first switch is located in the first display pixel and the second switch is located in the second display pixel.

11. A computer system comprising:
    a processor;
    a memory;
    a display system including a group of display pixels, each display pixel including display circuitry that includes a circuit element; and
    touch sensing circuitry in one or more of the display pixels including a conductive portion that includes one of the circuit elements wherein the conductive portion is a common electrode, first and second conductive lines, each of the first and the second conductive lines extending from the display pixel to an outer edge of the group of display pixels, a first switch that connects and disconnects the first conductive line to the conductive portion, and a second switch that connects and disconnects the second conductive line to the conductive portion.

* * * * *